US012638839B2

(12) United States Patent
Sepulveda et al.

(10) Patent No.: US 12,638,839 B2
(45) Date of Patent: May 26, 2026

(54) MACHINE EVENT DURATION ANALYTICS AND AGGREGATION FOR MACHINE HEALTH MEASUREMENT AND VISUALIZATION

(71) Applicant: Solar Turbines Incorporated, San Diego, CA (US)

(72) Inventors: Henry P. Sepulveda, San Diego, CA (US); David M. Higdon, San Diego, CA (US); David S. Glaser, Euless, TX (US); Jamaal A. Sanders, La Mesa, CA (US); Jonathan W. Rogers, San Diego, CA (US); Cody W. Allen, Escondido, CA (US); Chad Holcomb, Cottonwood Heights, UT (US)

(73) Assignee: Caterpillar Inc., Peoria, IL (US)

( * ) Notice: Subject to any disclaimer, the term of this patent is extended or adjusted under 35 U.S.C. 154(b) by 1064 days.

(21) Appl. No.: 17/710,664

(22) Filed: Mar. 31, 2022

(65) Prior Publication Data

US 2023/0315078 A1      Oct. 5, 2023

(51) Int. Cl.
*G05B 23/02*          (2006.01)

(52) U.S. Cl.
CPC ....... *G05B 23/0245* (2013.01); *G05B 23/027* (2013.01)

(58) Field of Classification Search
None
See application file for complete search history.

(56) References Cited

U.S. PATENT DOCUMENTS

| | | | |
|---|---|---|---|
| 6,289,735 B1 | 9/2001 | Dister et al. | |
| 7,383,097 B2 | 6/2008 | Jalluri et al. | |
| 2008/0082345 A1 | 4/2008 | Greiner et al. | |
| 2011/0040902 A1* | 2/2011 | Housty | G06F 11/3037 |
| | | | 710/61 |
| 2015/0323422 A1 | 11/2015 | Sarda et al. | |
| 2018/0308027 A1 | 10/2018 | Cline et al. | |

* cited by examiner

*Primary Examiner* — Carlos R Ortiz Rodriguez

(57)          ABSTRACT

The unexpected failure of a turbomachine can be costly and dangerous. Processes may collect data from a turbomachine, calculate durations of machine events from the collected data, and apply a model to those machine-event durations to predict future machine-event durations and/or detect trends in the machine-event durations. This predictive output may be utilized to inform downstream functions regarding the health of the turbomachine. For example, a downstream function may utilize the predictive output to detect degradation or a potential future failure in the turbomachine and trigger remedial functions, such as alerts and/or controls, to prevent or mitigate the degradation or failure of the turbomachine.

20 Claims, 3 Drawing Sheets

300

MACHINE EVENT DURATION ANALYTICS AND AGGREGATION FOR MACHINE HEALTH MEASUREMENT AND VISUALIZATION

TECHNICAL FIELD

The embodiments described herein are generally directed to monitoring machines (e.g., turbomachines, such as gas turbine engines or gas compressors), and, more particularly, to analyzing and aggregating machine event durations in a machine to measure and visualize the health of the machine.

BACKGROUND

The unexpected failure of a turbomachine, such as a gas turbine engine or gas compressor, can be costly in terms of injuries, repairing the turbomachine, disruption to operations, and the like. Accordingly, methods have been developed to monitor the health of such machines and predict failures. For example, U.S. Patent Pub. No. 2008/0082345 describes a method for analyzing health data associated with a machine and estimating a future failure date based on the analysis. The present disclosure is directed toward overcoming one or more of the problems discovered by the inventors.

SUMMARY

In an embodiment, a method of predicting an abnormal state in an engine comprises using at least one hardware processor to: receive data from an electronic control unit of an engine, wherein the data include values for a plurality of parameters of the engine, and wherein the values for the plurality of parameters include values for one or more machine events; calculate a duration of each of the one or more machine events from the values for the one or more machine events; generate a dataset that correlates the calculated durations with values for one or more of the plurality of parameters; apply a machine-learning model to the dataset to generate a predictive output that includes a predicted future duration of each of the one or more machine events; determine whether or not the predictive output is indicative of a future abnormal operating state of the engine; and, when the predictive output is indicative of a future abnormal operating state of the engine, execute at least one remedial function.

In an embodiment, a system comprises: at least one hardware processor; and software configured to, when executed by the at least one hardware processor, receive data from an electronic control unit of an engine, wherein the data include values for a plurality of parameters of the engine, and wherein the values for the plurality of parameters include values for one or more machine events, calculate a duration of each of the one or more machine events from the values for the one or more machine events, generate a dataset that correlates the calculated durations with values for one or more of the plurality of parameters, apply a machine-learning model to the dataset to generate a predictive output that includes a predicted future duration of each of the one or more machine events, determine whether or not the predictive output is indicative of a future abnormal operating state of the engine, and, when the predictive output is indicative of a future abnormal operating state of the engine, execute at least one remedial function.

In an embodiment, a non-transitory computer-readable medium has instructions stored thereon, wherein the instructions, when executed by a processor, cause the processor to:

receive data from an electronic control unit of an engine, wherein the data include values for a plurality of parameters of the engine, and wherein the values for the plurality of parameters include values for one or more machine events; calculate a duration of each of the one or more machine events from the values for the one or more machine events; generate a dataset that correlates the calculated durations with values for one or more of the plurality of parameters; apply a machine-learning model to the dataset to generate a predictive output that includes a predicted future duration of each of the one or more machine events; determine whether or not the predictive output is indicative of a future abnormal operating state of the engine; and, when the predictive output is indicative of a future abnormal operating state of the engine, execute at least one remedial function.

BRIEF DESCRIPTION OF THE DRAWINGS

The details of embodiments of the present disclosure, both as to their structure and operation, may be gleaned in part by study of the accompanying drawings, in which like reference numerals refer to like parts, and in which.

DETAILED DESCRIPTION

The detailed description set forth below, in connection with the accompanying drawings, is intended as a description of various embodiments, and is not intended to represent the only embodiments in which the disclosure may be practiced. The detailed description includes specific details for the purpose of providing a thorough understanding of the embodiments. However, it will be apparent to those skilled in the art that embodiments of the invention can be practiced without these specific details. In some instances, well-known structures and components are shown in simplified form for brevity of description.

Figure 1:
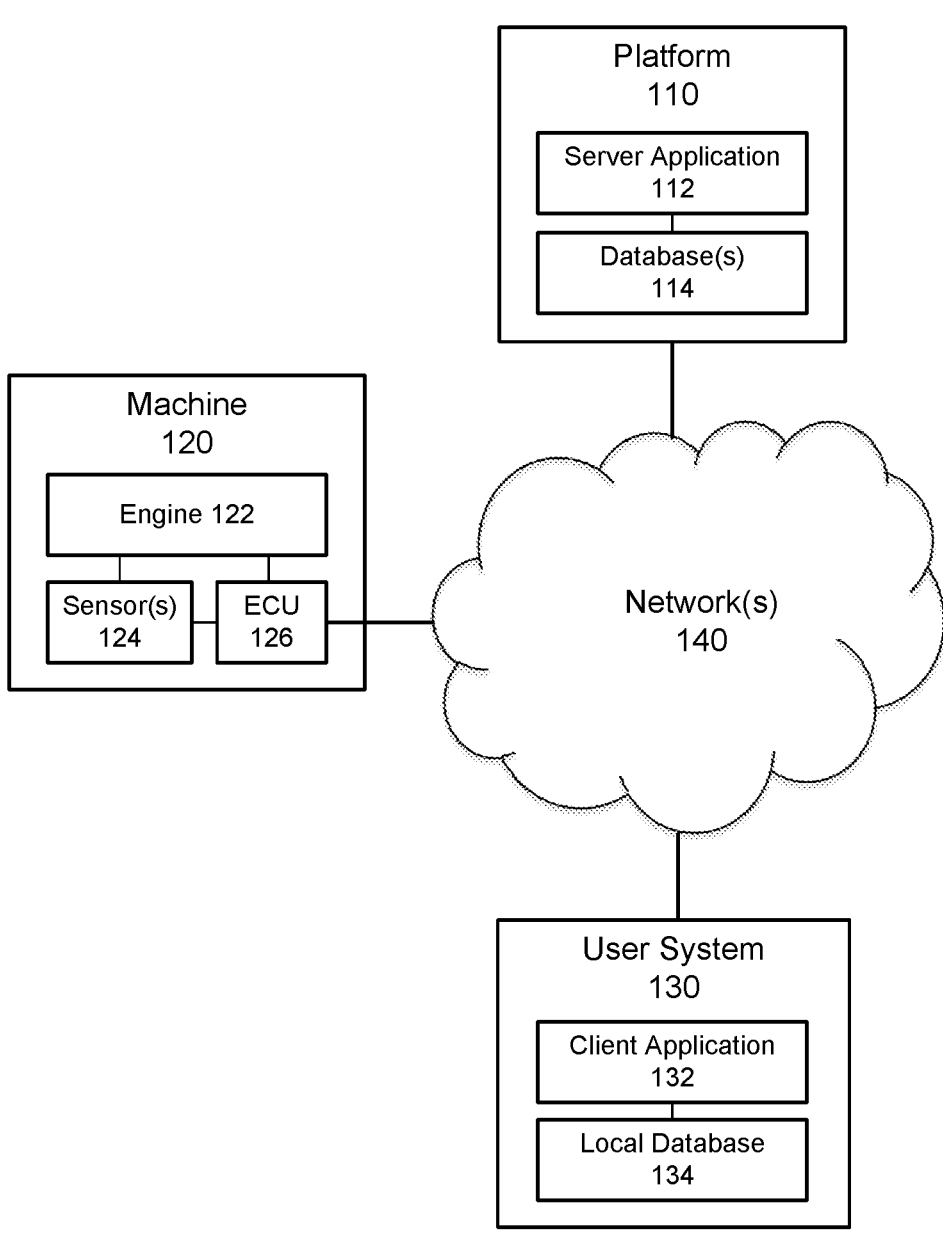
FIG. 1 illustrates an example infrastructure, in which one or more of the processes described herein, may be implemented, according to an embodiment.

FIG. 1 illustrates an example infrastructure in which one or more of the disclosed processes may be implemented, according to an embodiment. The infrastructure may comprise a platform 110 (e.g., one or more servers) which hosts and/or executes one or more of the various functions, processes, methods, and/or software modules described herein. Platform 110 may comprise dedicated servers, or may instead comprise cloud instances, which utilize shared resources of one or more servers. These servers or cloud instances may be collocated and/or geographically distributed. Platform 110 may also comprise or be communicatively connected to a server application 112 and/or one or more databases 114. In addition, platform 110 may be communicatively connected to one or more machines 120 and/or one or more user systems 130 via one or more networks 140. While only a single instance of machine 120 and a single instance of user system 130 are illustrated, it should be understood that the infrastructure may comprise any number of machines 120 and any number of user systems 130, communicatively coupled to platform 110 via network(s) 140.

Network(s) 140 may comprise the Internet, and platform 110 may communicate with machine(s) 120 and/or user system(s) 130 through the Internet using standard transmission protocols, such as HyperText Transfer Protocol (HTTP), HTTP Secure (HTTPS), File Transfer Protocol (FTP), FTP Secure (FTPS), Secure Shell FTP (SFTP), and the like, as well as proprietary protocols. While platform 110 is illustrated as being connected to various systems through a single set of network(s) 140, it should be understood that platform 110 may be connected to the various systems via different sets of one or more networks. For example, platform 110 may be connected to a subset of machines 120 and/or user systems 130 via the Internet, but may be connected to one or more other machines 120 and/or user systems 130 via an intranet.

Each machine 120 may be a turbomachine, such as a gas turbine engine or gas compressor (e.g., in a pipeline). Alternatively, machine 120 may be another type of machine. It is generally contemplated that machine 120 comprises an engine 122. Various parameters of engine 122 may be sensed by one or more sensors 124 within machine 120. An electronic control unit (ECU) 126, may collect the values of these parameters and transmit the parameter values to platform 110 for analysis by server application 112 and/or storage in database 114. It should be understood that ECU 126 may send the parameter values to platform 110 as raw sensor or signal data or may perform pre-processing on the data and send the parameter values to platform 110 as pre-processed data.

Each user system 130 may comprise any type of computing device capable of wired and/or wireless communication, including without limitation, desktop computers, laptop computers, tablet computers, smart phones or other mobile phones, servers, game consoles, televisions, set-top boxes, electronic kiosks, point-of-sale terminals, and/or the like. However, it is generally contemplated that each user system 130 is the personal or work device of a user that operates, manages, assesses, and/or otherwise has an interest in the health of machine 120. Different users with different roles may utilize their particular user systems 130 to interact with server application 112 on platform 110 in accordance with their individual roles, as defined by a user account with platform 110. Each user system 130 may comprise or be communicatively connected to a client application 132 and/or one or more local databases 134.

Platform 110 may comprise one or more web servers which host one or more websites and/or web services. In embodiments in which a website is provided, the website may comprise a graphical user interface, including, for example, one or more screens (e.g., webpages) generated in HyperText Markup Language (HTML) or other language. Platform 110 transmits or serves one or more screens of the graphical user interface, which may be generated by server application 112, in response to requests from user system(s) 130. In some embodiments, these screens may be served in the form of a wizard, in which case two or more screens may be served in a sequential manner, and one or more of the sequential screens may depend on an interaction of the user or user system 130 with one or more preceding screens. The requests to platform 110 and the responses from platform 110, including the screens of the graphical user interface, may both be communicated through network(s) 140, which may include the Internet, using standard communication protocols (e.g., HTTP, HTTPS, etc.). These screens (e.g., webpages) may comprise a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and the like, including elements comprising or derived from data stored in one or more databases (e.g., database(s) 114) that are locally and/or remotely accessible to platform 110.

As mentioned above, platform 110 may comprise, be communicatively coupled with, or otherwise have access to one or more database(s) 114. For example, platform 110 may comprise one or more database servers which manage one or more databases 114. Server application 112 executing on platform 110, and/or client application 132 executing on user system 130, may submit data (e.g., user data, form data, any of the user input or other data described herein, etc.) to be stored in database(s) 114, and/or request access to data stored in database(s) 114. Any suitable database may be utilized, including without limitation MySQL™, Oracle™ IBM™, Microsoft SQL™, Access™, PostgreSQL™, and the like, including cloud-based databases and proprietary databases. Data may be sent to platform 110, for instance, using the well-known POST request supported by HTTP, via FTP, and/or the like. This data, as well as other requests, may be handled, for example, by server-side web technology, such as a servlet or other software module (e.g., comprised in server application 112), executed by platform 110.

In embodiments in which a web service is provided, platform 110 may receive requests from external systems, and provide responses in eXtensible Markup Language (XML), JavaScript Object Notation (JSON), and/or any other suitable or desired format. In such embodiments, platform 110 may provide an application programming interface (API) (e.g., implemented by a Representation State Transfer (REST) architecture) which defines the manner in which machine(s) 120, user system(s) 130, and/or other external system(s) may interact with the web service. Thus, user system(s) 130 and/or other external systems (which may themselves be servers), can define their own user interfaces, and rely on the web service to implement or otherwise provide the backend processes, methods, functionality, storage, and/or the like, described herein. For example, in such an embodiment, a client application 132, executing on one or more user system(s) 130, may interact with a server application 112 executing on platform 110 to execute one or more or a portion of one or more of the various functions, processes, methods, and/or software modules described herein. In this case, client application 132 may generate the graphical user interface and access functionality on platform 110 via the API.

Client application 132 may be "thin," in which case processing is primarily carried out server-side by server application 112 on platform 110. A basic example of a thin client application 132 is a browser application, which simply requests, receives, and renders webpages at user system(s) 130, while server application 112 on platform 110 is responsible for generating the webpages, managing database functions, and providing all backend functionality. Alternatively, the client application may be "thick," in which case processing is primarily carried out client-side by user system(s) 130. It should be understood that client application 132 may perform an amount of processing, relative to server application 112 on platform 110, at any point along this spectrum between "thin" and "thick," depending on the design goals of the particular implementation. In any case, the software described herein, which may wholly reside on either platform 110 (e.g., in which case server application 112 performs all processing) or user system(s) 130 (e.g., in which case client application 132 performs all processing) or be distributed between platform 110 and user system(s) 130 (e.g., in which case server application 112 and client application 132 both perform processing), can comprise one or more executable software modules comprising instructions that implement one or more of the processes, methods, or functions described herein.

Figure 2:
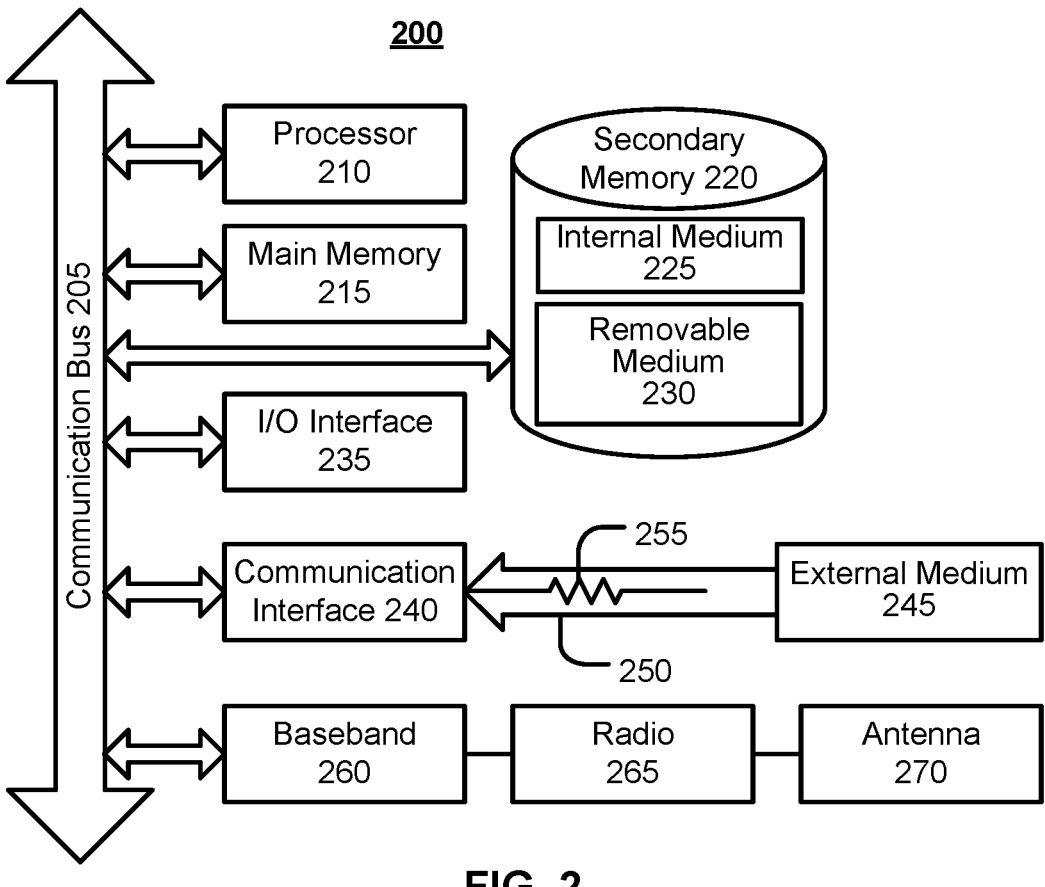
FIG. 2 illustrates an example processing system, by which one or more of the processes described herein, may be executed, according to an embodiment.

FIG. 2 is a block diagram illustrating an example wired or wireless system 200 that may be used in connection with various embodiments described herein. For example, system 200 may be used as or in conjunction with one or more of the functions, processes, or methods described herein (e.g., to store and/or execute the implementing software), and may represent components of platform 110, ECU 126, user system(s) 130, and/or other processing devices described herein. System 200 can be a server or any conventional personal computer, or any other processor-enabled device that is capable of wired or wireless data communication. Other computer systems and/or architectures may be also used, as will be clear to those skilled in the art.

System 200 preferably includes one or more processors 210. Processor(s) 210 may comprise a central processing unit (CPU). Additional processors may be provided, such as a graphics processing unit (GPU), an auxiliary processor to manage input/output, an auxiliary processor to perform floating-point mathematical operations, a special-purpose microprocessor having an architecture suitable for fast execution of signal-processing algorithms (e.g., digital-signal processor), a processor subordinate to the main processing system (e.g., back-end processor), an additional micro-processor or controller for dual or multiple processor systems, and/or a coprocessor. Such auxiliary processors may be discrete processors or may be integrated with processor 210. Examples of processors which may be used with system 200 include, without limitation, any of the processors (e.g., Pentium™, Core i7™, Xeon™, etc.) available from Intel Corporation of Santa Clara, California, any of the processors available from Advanced Micro Devices, Incorporated (AMD) of Santa Clara, California, any of the processors (e.g., A series, M series, etc.) available from Apple Inc. of Cupertino, any of the processors (e.g., Exynos™) available from Samsung Electronics Co., Ltd., of Seoul, South Korea, any of the processors available from NXP Semiconductors N.V. of Eindhoven, Netherlands, and/ or the like.

Processor 210 is preferably connected to a communication bus 205. Communication bus 205 may include a data channel for facilitating information transfer between storage and other peripheral components of system 200. Furthermore, communication bus 205 may provide a set of signals used for communication with processor 210, including a data bus, address bus, and/or control bus (not shown). Communication bus 205 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE), and/or the like.

System 200 preferably includes a main memory 215 and may also include a secondary memory 220. Main memory 215 provides storage of instructions and data for programs executing on processor 210, such as any of the software discussed herein. It should be understood that programs stored in the memory and executed by processor 210 may be written and/or compiled according to any suitable language, including without limitation C/C++, Java, JavaScript, Perl, Visual Basic, .NET, and the like. Main memory 215 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 220 is a non-transitory computer-readable medium having computer-executable code (e.g., any of the software disclosed herein) and/or other data stored thereon. The computer software or data stored on secondary memory 220 is read into main memory 215 for execution by processor 210. Secondary memory 220 may include, for example, semiconductor-based memory, such as programmable read-only memory (PROM), erasable programmable read-only memory (EPROM), electrically erasable read-only memory (EEPROM), and flash memory (block-oriented memory similar to EEPROM).

Secondary memory 220 may optionally include an internal medium 225 and/or a removable medium 230. Removable medium 230 is read from and/or written to in any well-known manner. Removable storage medium 230 may be, for example, a magnetic tape drive, a compact disc (CD) drive, a digital versatile disc (DVD) drive, other optical drive, a flash memory drive, and/or the like.

In an embodiment, I/O interface 235 provides an interface between one or more components of system 200 and one or more input and/or output devices. Example input devices include, without limitation, sensors, keyboards, touch screens or other touch-sensitive devices, cameras, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., in a smartphone, tablet computer, or other mobile device).

System 200 may include a communication interface 240. Communication interface 240 allows software and data to be transferred between system 200 and external devices (e.g. printers), networks, or other information sources. For example, computer software or executable code may be transferred to system 200 from a network server (e.g., platform 110) via communication interface 240. Examples of communication interface 240 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 200 with a network (e.g., network(s) 140) or another computing device. Communication interface 240 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 240 are generally in the form of electrical communication signals 255. These signals 255 may be provided to communication interface 240 via a communication channel 250. In an embodiment, communication channel 250 may be a wired or wireless network (e.g., network(s) 140), or any variety of other communication links. Communication channel 250 carries signals 255 and can be implemented using a variety of wired or wireless communication means including wire or cable, fiber optics, conventional phone line, cellular phone link, wireless data communication link, radio frequency ("RF") link, or infrared link, just to name a few.

Computer-executable code (e.g., computer programs, such as the disclosed software) is stored in main memory 215 and/or secondary memory 220. Computer-executable code can also be received via communication interface 240 and stored in main memory 215 and/or secondary memory 220. Such computer programs, when executed, enable system 200 to perform the various functions of the disclosed embodiments described elsewhere herein.

In this description, the term "computer-readable medium" is used to refer to any non-transitory computer-readable storage media used to provide computer-executable code and/or other data to or within system 200. Examples of such media include main memory 215, secondary memory 220 (including internal memory 225 and/or removable medium 230), external storage medium 245, and any peripheral device communicatively coupled with communication interface 240 (including a network information server or other network device). These non-transitory computer-readable media are means for providing software and/or other data to system 200.

System 200 may also include optional wireless communication components that facilitate wireless communication over a voice network and/or a data network (e.g., in the case of user system 130). The wireless communication components comprise an antenna system 270, a radio system 265, and a baseband system 260. Baseband system 260 is communicatively coupled with processor(s) 210. In system 200, radio frequency (RF) signals are transmitted and received over the air by antenna system 270 under the management of radio system 265.

Figure 3:
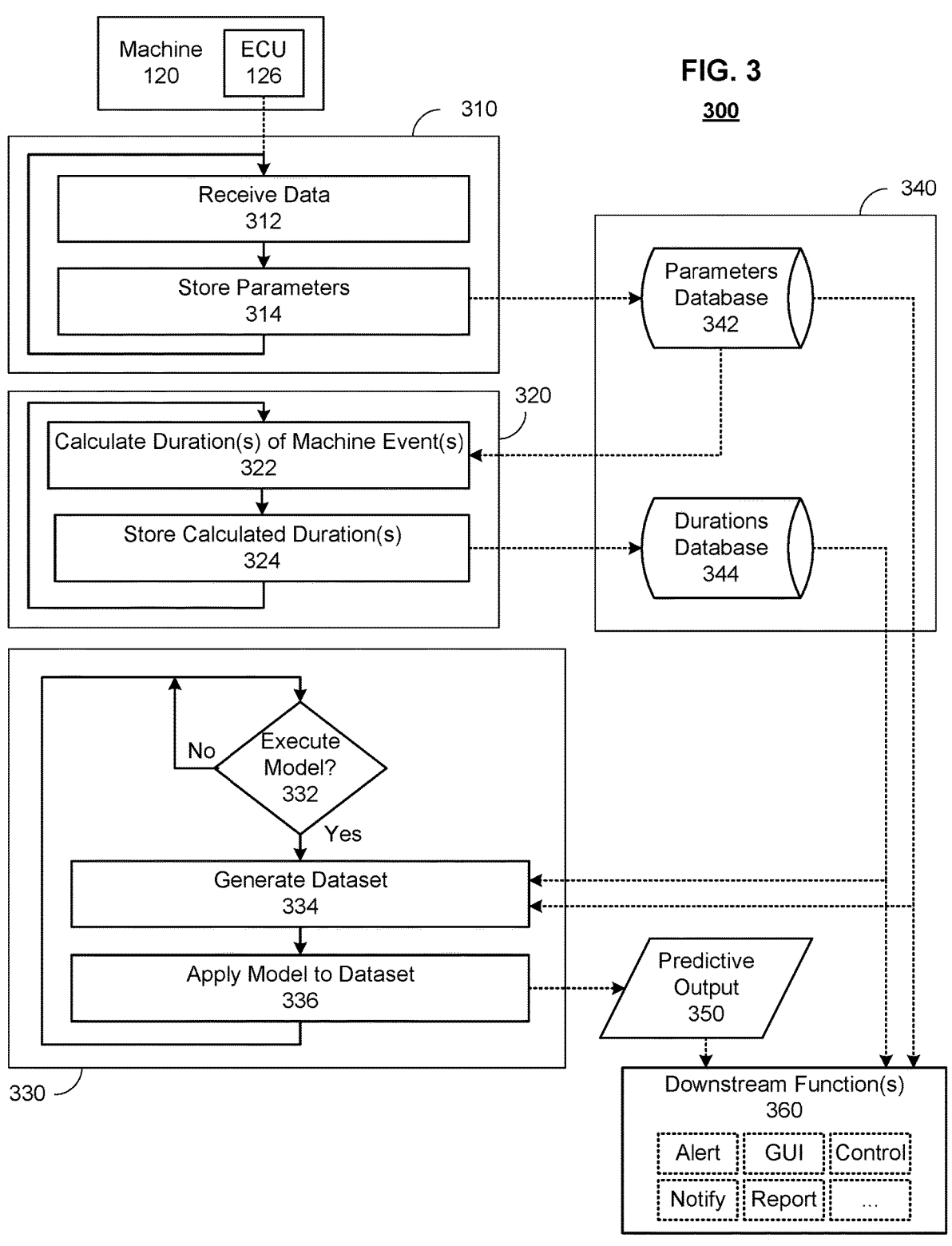
FIG. 3 illustrates an example architecture of processes, according to an embodiment.

FIG. 3 illustrates an example architecture 300 of processes, according to an embodiment. In particular, architecture 300 may comprise a data-collection process 310, a data-processing process 320 that utilizes data collected during data-collection process 310, and a model-execution process 330 that utilizes data collected during data-collection process 310 and/or generated by data-processing process 320. Data-collection process 310, data-processing process 320, and model-execution process 330 may be implemented on platform 110, for example, within the same server application 112 or within separate server applications 112. It should be understood that, although some processes may rely on data produced by other processes, each of data-collection process 310, data-processing process 320, and model-execution process 330 may execute independently of the other processes. In addition, while the processes are illustrated with a certain arrangement and ordering of subprocesses, each process may be implemented with fewer, more, or different subprocesses and a different arrangement and/or ordering of subprocesses. Furthermore, any subprocess, which does not depend on the completion of another subprocess, may be executed before, after, or in parallel with that other independent subprocess, even if the subprocesses are described or illustrated in a particular order.

In an embodiment, ECU 126 of machine 120 transmits data, which has been collected for machine 120, to data-collection process 310. This data may comprise values of a plurality of parameters, including machine events of machine 120, that are output by or derived from sensor(s) 124 and/or monitored by ECU 126. As used herein, the term "machine event" may refer to any monitorable event at machine 120, including any engine state of engine 122, any process mode of engine 122, any control mode of engine 122, a state of any other component of machine 120, and the like. ECU 126 may transmit this data periodically, may stream the data in real time, or may stream some data in real time while transmitting other data periodically. In the case of periodic transmission, the data may automatically transmitted after predetermined intervals of time, transmitted in response to a machine event (e.g., change in state or mode) occurring at machine 120, transmitted in response to a request sent by platform 110 or another system, and/or the like. ECU 126 may "push" the data to data-collection process 310, for example, via an API provided by platform 110. Alternatively, data-collection process 310 may "pull" the data, for example, via an API provided by ECU 126 or by a monitoring system that relays data from ECU 126. It should be understood that the transmission of data from ECU 126 to data-collection process 310 may be performed over network(s) 140. In addition, as used herein, the term "real time" encompasses events that occur simultaneously, as well as events that are separated by ordinary delays resulting from processing latencies, network latencies, and/or the like.

In an embodiment, a monitoring system between ECU 126 and platform 110 may pre-process data before relaying the data to platform 110. In some cases, the monitoring system may convert signals in the data from ECU 126 to parameter values representing a machine event. For example, a signal representing a machine event may be converted into a binary value representing the machine event based on one or more thresholds. In particular, the signal may be converted into a binary value indicating the presence of a machine event when the signal satisfies one or more predefined criteria (e.g., threshold(s)) and indicating the absence of the machine event when the signal does not satisfy the one or more predefined criteria. For instance, if the signal exceeds a threshold, the monitoring system may convert the signal into a first value, and otherwise, the monitoring system may convert the signal into a second value. The first value may indicate the presence of a machine event, whereas the second value indicates the absence of the machine event, or vice versa. Alternatively, such pre-processing may be performed at platform 110 or may be omitted entirely.

In subprocess 312, data-collection process 310 receives the data transmitted by ECU 126 (e.g., potentially pre-processed as discussed above). Data-collection process 310 may execute continuously to process the data, in real time, as the data are received. Alternatively, data-collection process 310 may operate periodically (e.g., after predetermined intervals of time or in response to an event or request) to process the received data in batches. The received data may comprise the value of one or more parameters of engine 122 or other components of machine 120, including machine events of machine 120.

Examples of machine events which may be collected (e.g., for a turbomachine) include, without limitation, crank, purge, ignition, flow, discharge, suction, surge, low emission mode (e.g., SoLoNOx™), pressurized hold, blowdown, valve open, valve closed, alert, and/or the like. Each of these machine events may be represented as a binary value representing either the absence of presence of the particular machine event. Thus, it should be understood that the duration of a machine event may represent the duration for which the value of the machine event indicates the presence of the machine event.

In subprocess 314, the values of one or more parameters may be parsed from the received data and stored in a parameters database 342 within a database 340. Database 340 may be comprised in database 114 of platform 110. The stored parameter values may comprise indications of one or more machine events of machine 120. Each machine event may be represented as a binary indication, with one value (e.g., "0," "false," "off", "down/low," etc.) indicating an absence of the machine event, and the other value (e.g., "1," "true," "on," "up/high," etc.) indicating a presence of the machine event. However, it should be understood that one or more, including potentially all, of the machine events may be represented in any other suitable manner, including by a value that may be one of three or more possible finite values, a real number value, and/or the like. The stored parameter values may also comprise the value of operating parameters of engine 122, such as ambient temperature, oil temperature, seasonality, power output, engine speed, and/or other engine process variables. The stored parameter values may also comprise values representing an event history for engine 122 (e.g., timestamps of alarms, shutdowns, etc.), a repair history for engine 122 (e.g., operating hours since last repair or overhaul performed on engine 122, number or frequency of repairs performed on engine 122, etc.), and/or the like.

It should be understood data-collection process 310 may collect data from a plurality of ECUs 126 of a plurality of machines 120. In this case, each parameter value or set of parameter values may be stored in parameters database 342 in association with (e.g., indexed by) an identifier of the machine 120 to which the parameter value(s) pertain. Thus, a set of all parameter values (e.g., satisfying one or more criteria or filters, such as occurring in a given time period) for a given machine 120 may be easily retrieved from parameters database 342.

Whereas data-collection process 310 collects and stores parameters of each machine 120, data-processing process 320 may process the stored parameters for each machine 120 to populate a durations database 344. Data-processing process 320 may execute continuously to process the parameter values stored in parameters database 342, in real time, as the parameter values are stored. Alternatively, data-processing process 320 may operate periodically (e.g., after predetermined intervals of time or in response to an event or request) to process the stored parameter values in batches.

In subprocess 322, the values of one or more machine events may be retrieved from parameters database 342 for a given machine 120, and one or more durations may be calculated for each machine event. In particular, each machine event value may be associated with a timestamp that indicates the time of the machine event value. Thus, the time between an indication of a presence of the first machine event and the indication of an absence of the first machine event (or a presence of a second machine event that is exclusive of the first machine event) may be calculated as the duration of the first machine event. It should be understood that, in this example, if consecutive or continuous indications of the first machine event occur prior to the indication of the absence of the first machine event (or the presence of the second machine event), the chronologically first indication of the first machine event may be used for the duration calculation.

A duration may be calculated for each possible value of a machine event. Alternatively, a duration may be calculated for only a partial subset of one or more possible values of a machine event. For example, for each machine event that is represented by a binary value (i.e., indicating either the absence or presence of the machine event), the duration of the machine event may be calculated only for the presence of the machine event.

It should be understood that, depending on the time window represented by the parameter values retrieved in subprocess 322, there may be multiple durations calculated for a given machine event. For example, if engine 122 goes in and out of a given machine event several times throughout the time window, there may be several durations calculated for the given machine event for the time window. In this case, the durations may be maintained as separate and distinct durations or summed, averaged, or otherwise combined into a single duration for the time window, depending on the machine event and/or the particular design and objectives of the application.

In subprocess 324, the duration(s) calculated in subprocess 322 for each machine event may be stored in a durations database 344 within database 340. Each duration may be stored in association with (e.g., indexed by) the identifier of the machine event and the identifier of the machine 120 to which the duration pertains. Thus, a set of durations (e.g., satisfying one or more criteria or filters, such as occurring in a given time period) for a given machine event in a given machine 120 may be easily retrieved from durations database 344.

Whereas data-collection process 310 collects and stores parameters of each machine 120 and data-processing process 320 calculates and stores the durations of machine events, model-execution process 330 operates on those durations and parameters to generate a predictive output 350. In the illustrated embodiment, a model is executed periodically. For example, the model may be executed automatically after each expiration of a predetermined interval of time (e.g., once every hour, once every twenty-four hours, once every week, etc.), automatically in response to another event (e.g., an event at machine 120 that is communicated to platform 110), in response to a user request (e.g., submitted via a graphical user interface provided by server application 112 and/or client application 132), and/or in response to any other type of trigger. In an alternative embodiment, the model may be executed continuously, in real time, as the parameter values are stored by data-collection process 310 and the durations calculated by data-processing process 320.

As mentioned above, data-collection process 310, data-processing process 320, and model-execution process 330 may operate independently from each other. For example, data-collection process 310 may execute continuously to receive and store data in real time as it is received. Data-processing process 320 may execute continuously to calculate durations as parameter values are stored in parameters database 342 or periodically to calculate durations for batches of parameter values stored in parameters database 342 since the last execution. Model-execution process 330 may execute continuously to generate predictive output 350 as parameter values and durations are stored in database 340 or periodically to generate predictive output 350 for batches of parameter values and durations stored in database 340 since the last execution. In general, to improve efficiency, data-processing process 320 may execute at a slower rate than data-collection process 310 to ensure that sufficient parameter values have been accumulated in parameters database 342, and model-execution process 330 may execute at a slower rate than data-processing process 320 to ensure that sufficient durations and parameter values have been accumulated in database 340.

In subprocess 332, it is determined whether or not to execute the model. For example, it may be determined to execute the model in response to an event, such as the expiration of a predetermined interval of time, an event at machine 120, a user request, and/or the like. If it is determined not to execute the model (i.e., "No" in subprocess 332), model-execution process 330 continues to wait for a triggering event. On the other hand, if it is determined to execute the model (i.e., "Yes" in subprocess 332), a dataset is generated in subprocess 334.

In subprocess 334, the dataset may be generated from one or more parameter values in parameters database 342 and one or more durations in durations database 344. In particular, for a given machine 120, a set of one or a plurality of relevant parameter values, associated with the given machine 120, for a relevant time period (e.g., a sliding time window on which the model operates, a time period since the last execution of model-execution process 330, etc.) may be retrieved from parameters database 342. Similarly, one or a plurality durations for a set of one or a plurality of relevant machine events, associated with the given machine 120, for the same relevant time period may be retrieved from durations database 344. The retrieved parameter values and the retrieved durations may be correlated and formatted into a dataset, for example, comprising one or a plurality of feature vectors derived from the retrieved parameter values and durations. In an embodiment, for each occurrence of a machine event of interest, a feature vector may be generated comprising the duration of the occurrence and the values of one or more parameter values recorded during the same time period as the occurrence and/or otherwise correlated to the occurrence. For example, in the case of a turbomachine, the parameter values may comprise values representing ambient temperature, oil temperature, seasonality, power output, engine speed, engine event history, engine repair history, and/or the like. The dataset may comprise the feature vectors for each occurrence of a machine event of interest during the relevant time period. In the event that a model is to be executed for a plurality of different machine events, a separate dataset may be generated for each of the plurality of machine events.

In subprocess 336, a model may be applied to each dataset. In the event that a model is to be executed for a plurality of different machine events, a different model may be applied to the dataset that was generated for each of the plurality of different machine events. In addition, different models may be applied to the dataset(s) for different machines 120. For example, each machine 120 or each type (e.g., model) of machine may be associated with a different model or set of models. Thus, in an embodiment, each machine 120 or type of machine 120 may be associated with a plurality of models, with each of the plurality of models corresponding to one of a plurality of machine events. These models may be stored in database 114 and managed via a graphical user interface generated by server application 112.

Each model may be a machine-learning model that accepts a feature vector for a particular machine event as input and outputs a predicted duration of the next occurrence of that particular machine event. In an embodiment, the predicted duration may be one of a finite set of classes based on one or more thresholds. For example, the machine-learning model may predict a time duration, and this time duration may be classified into one of three classes: (1) a "short" class if the time duration is less than a first threshold; (2) a "same" class if the time duration is between the first threshold and a second threshold; and (3) a "long" class if the time duration is greater than the second threshold. In this case, the predicted duration may be one of these plurality of classes. Alternatively, the machine-learning model may directly predict the class without having to determine a particular time duration. As another alternative, the predicted duration may be a predicted time duration (e.g., in operating hours). The output of the machine-learning model may also comprise a probability or confidence value of the predicted duration. Thus, predictive output 350 may comprise, for each machine event being predicted, the predicted duration of the next occurrence of the machine event and the confidence value of that predicted duration.

The machine-learning model may comprise a regression tree, classification tree, support vector regression (SVR), polynomial regression, random forest regression, logistic regression, an ensemble of machine-learning algorithms, and/or the like. It should be understood that each machine-learning model may have been previously trained using any available supervised or unsupervised learning techniques. For example, in a supervised learning technique, a training dataset may be generated with feature vectors, comprising the same set of features that are used for the dataset in subprocess 334, but labeled with the ground-truth durations. It should be understood that these labeled feature vectors with ground-truth durations may be derived through empirical observations of the actual operation of machine 120 or the same type of machine 120 and/or through simulations of machine 120. An initial machine-learning model may then be applied to each labeled feature vector from a portion of the training dataset and adjusted after each iteration (e.g., by adjusting weights in the machine-learning model) to minimize an error between the predicted durations and the ground-truth durations. The trained machine-learning model may then be validated and tested on the remaining portion of the training dataset to evaluate its accuracy. This learning process may be performed iteratively until an accuracy of the machine-learning model exceeds an acceptable threshold or no further improvement in accuracy is achieved.

The particular set of features to be used as input to each machine-learning model may be determined during feature selection based on physics that apply to the particular machine event for which a duration is to be predicted. For example, a given machine event may depend on a particular component of engine 122. In this case, any parameters that may affect the health or performance of that component can be included in the set of features to be used for the machine-learning model for that machine event. The set of features may include those parameters that both directly and indirectly affect the health or performance of that component.

In an embodiment, each model may be a statistical model that analyzes the durations and/or parameter values for one or more machine events. Alternatively, both a machine-learning and statistical model may be applied to the dataset or separate datasets. The statistical model may identify trends in the dataset (e.g., durations), such as a trend that predicts a consistent increase or decrease in the duration of a machine event, to detect degradations or failures of machine 120. For example, if a past duration for an ignition state of engine 122 was 16 seconds, followed by 17 seconds, followed by 18 seconds, and the duration predicted by the machine-learning model is 19 seconds, the statistical model may detect the degradation or a high probability that engine 122 will fail upon a future ignition. Predictive output 350 may comprise an indication of one or more trends identified by the statistical model, such as an indication of a degradation or future failure.

Predictive output 350, which may comprise the predicted duration and confidence value for the next occurrence of one or a plurality of machine events and/or the result (e.g., degradation or failure detection) of statistical analysis, may be used for one or more downstream functions 360. Downstream function(s) 360 may include, without limitation, alerts, notifications, visualization of and/or interaction with predictive output 350 via a graphical user interface (e.g., dashboard of a user account with platform 110), reports, control, and/or the like. At least some of downstream function(s) 360 may be remedial functions designed to prevent abnormal operation of machine 120. Abnormal operation of machine 120 may include, without limitation, a degradation or failure in machine 120 or other unhealthy, unsafe, and/or inefficient operation of machine 120. For example, remedial functions may include an alert to an appropriate user or other recipient, a control of machine 120, and/or the like.

Predictive output 350 may be evaluated or analyze to determine whether or not predictive output 350 is indicative of abnormal operation of machine 120. For example, if the predicted duration of the next occurrence of a machine event or set of two or more machine events satisfies a threshold (e.g., exceeds or is less than the threshold, depending on the machine event) and/or the statistical results detect a degradation or failure, the logic of downstream function(s) 360 may determine that machine 120 is subject to future abnormal operation. In this case, downstream function(s) 360 may send an alert to a user of platform 110 (e.g., representing an operator of machine 120) or otherwise notify the user. The alert or notification may be sent via any communication method, including, without limitation, an internal message to a user account of the user on platform 110, presentation in a dashboard of the graphical user interface for the user account, email message to an email address of the user, text message (e.g., Short Message Service (SMS) or Multimedia Messaging Service (MMS) message) to a mobile telephone number of the user, telephone call with a recorded or synthesized message to a telephone number of the user, and/or the like. It should be understood that the communication method may be selected based on the urgency of the predicted future abnormal operation, a user setting, a system setting, and/or the like. The alert or notification may identify the future abnormal operation and/or comprise a recommended action, such as shutdown or maintenance of engine 122, repair or replacement of a component of engine 122, overhaul of engine 122, and/or the like.

In an embodiment, one or more types of future abnormal operation may trigger control of machine 120. For example, if the logic of downstream function(s) 360 determines that predictive output 350 is indicative of imminent unsafe operation or failure of machine 120, the logic may generate and transmit a control command to ECU 126 of machine 120 (e.g., over network(s) 140) to initiate a transition of machine 120 to a different engine state or mode (e.g., a shutdown state, an idle state, etc.). As another example, downstream function(s) 360 could implement more complex logic that optimizes operation of machine 120 based on predictive output 350. Such optimization could also be based on parameter values from parameters database 342 and/or machine-event durations from durations database 344. This logic may continually and automatically generate and transmit control commands to ECU 126 of machine 120 (e.g., over network(s) 140) to transition machine 120 between various engine states or modes in accordance with a determined optimal operation. Alternatively, the logic may provide recommendations to a user (e.g., representing the operator of machine 120), via a communication method, to be manually implemented by the operator for optimal operation of machine 120.

Downstream function(s) 360, which may be comprised in server application 112, may generate a graphical user interface with a user-specific dashboard for each user account and/or generate reports for one or more machines 120 managed by each user account, based on predictive output 350, parameter values from parameters database 342, and/or machine-event durations from durations database 344. The generated reports may be static reports (e.g., within the graphical user interface or as a data file) and/or interactive reports (e.g., within the graphical user interface and comprising inputs). Each report may comprise graphs, charts, tables, and/or the like that convey raw, analytic, or statistical data derived from predictive output 350, parameter values from parameters database 342, and/or machine-event durations from durations database 344.

INDUSTRIAL APPLICABILITY

The disclosed processes and architecture collect data, including machine events, for a machine 120, calculate durations of those machine events, and apply a model to those machine-event durations and optionally other features to predict future machine-event durations and/or detect trends in the machine-event durations. This predictive output may then be utilized to inform downstream function(s) 360 regarding the health of machine 120. In embodiments, the downstream function(s) 360 may utilize the predictive output to detect degradation or a potential future failure in machine 120 and trigger remedial functions, such as alerts and/or controls, to prevent or mitigate the degradation or failure of machine 120.

The particular machine events for which durations are monitored and predicted will depend on the particular application or objective. In a first example application, the monitored and predicted machine events may comprise events related to startup and shutdown of engine 122, such as a crank mode, purge mode, and ignition mode. In this case, an abnormal operation may be detected when the predicted duration of one or more of these machine events exceeds a threshold that is indicative of an abnormally long startup or shutdown time.

As a second example, the monitored and predicted machine events may comprise process control modes of engine 122 in a particular engine state (e.g., "On_Load" state), such as a flow mode, discharge mode, suction mode, and surge mode. In this case, an abnormal operation may be detected by comparing the predicted duration of one or more of these machine events to thresholds that are indicative of abnormally long or short durations for the given machine event.

As a third example, the monitored and predicted machine events may comprise emission modes related to the regulation of emissions from machine 120, such as a low-emissions mode (e.g., SoLoNOx™), pressurized-hold mode, and blowdown mode. In this case, an abnormal operation may be detected by comparing the predicted duration of one or more of these machine events to thresholds that are indicative of abnormally long or short durations for the given machine event. For example, an abnormally short low-emissions mode may indicate that machine 120 is emitting too large a volume of pollutant. Alternatively or additionally, the predicted duration of one or more of these machine events may be used to predict future emissions of machine 120. This can be especially useful in industries or regions in which emissions are heavily regulated.

As a fourth example, the monitored and predicted machine events may comprise valve states, such as an open state and a closed state. In particular, gas compression systems use many process valves. Valve stiction and limit switches can cause a valve to move slowly. Thus, the durations of valve strokes for one or more valves may be calculated and predicted. An abnormal operation may be detected by comparing the predicted duration of a valve stroke to a threshold that is indicative of an abnormally long valve stroke. An abnormally long predicted duration for a valve stroke may indicate a problem with the valve which could eventually result in a failure and unplanned shutdown. Thus, downstream function(s) 360 may alert the operator, in order to prevent the potential failure.

As a fifth example, the monitored and predicted machine events may comprise one or more alert states. Each alert state may have a binary value indicating that machine 120 is either in the alert state or not in the alert state. In particular, ECU 126 may transmit an analog signal representing a parameter value, and a monitoring system or data-collection process 310 may compare the value of the analog signal to a threshold, and store the alert state as a binary value representing whether or not the parameter value is above the threshold. It should be understood that which side of the threshold represents the alert state and which side of the threshold represents the non-alert state will depend on the parameter. In some cases, a high parameter value may be of concern, while, in other cases, a low parameter value may be of concern. In any case, data-collection process 310 may store the binary alert state, rather than or in addition to the actual parameter value, and data-processing process 320 may calculate the duration of the alert state. An abnormal operation may be detected by comparing the predicted duration of an alert state to a threshold that is indicative of an abnormally long alert state. An abnormally long alert state may indicate a problem which could eventually result in a failure and unplanned shutdown. Thus, downstream function(s) 360 may alert the operator, in order to prevent the potential failure.

It will be understood that the benefits and advantages described above may relate to one embodiment or may relate to several embodiments. Aspects described in connection with one embodiment are intended to be able to be used with the other embodiments. Any explanation in connection with one embodiment applies to similar features of the other embodiments, and elements of multiple embodiments can be combined to form other embodiments. The embodiments are not limited to those that solve any or all of the stated problems or those that have any or all of the stated benefits and advantages. [63] The preceding detailed description is merely exemplary in nature and is not intended to limit the invention or the application and uses of the invention. The described embodiments are not limited to usage in conjunction with a particular type of machine. Hence, although the present embodiments are, for convenience of explanation, depicted and described as being implemented in a turbomachine, such as a gas turbine engine or gas compressor, it will be appreciated that it can be implemented in various other types of machines and machines with engines, and in various other systems and environments. Furthermore, there is no intention to be bound by any theory presented in any preceding section. It is also understood that the illustrations may include exaggerated dimensions and graphical representation to better illustrate the referenced items shown, and are not considered limiting unless expressly stated as such.

What is claimed is:

1. A method of controlling an engine based on predicting an abnormal state in the engine, the method comprising using at least one hardware processor to:

receive operating data from an electronic control unit of an engine, wherein the operating data includes values for a plurality of parameters of the engine, and wherein the values for the plurality of parameters include values for one or more machine events;

calculate a duration of each of the one or more machine events from the values for the one or more machine events;

generate a dataset that correlates the calculated durations with values for one or more of the plurality of parameters;

receive, from a trained machine-learning model, a predictive output that includes a predicted future duration of each of the one or more machine events;

determine whether or not the predictive output is indicative of a future abnormal operating state of the engine; and, when the predictive output is indicative of a future abnormal operating state of the engine, execute at least one remedial function to control the engine, the at least one remedial function including transmitting a control command to the electronic control unit of the engine to initiate a transition of the engine from a first state to a second state that is different than the first state, so as to prevent or mitigate the future abnormal operating state.

2. The method of claim 1, wherein each value for each of the one or more machine events is a binary value that indicates either a presence of the machine event or an absence of the machine event.

3. The method of claim 1, wherein the dataset comprises, for each calculated duration of a machine event, a feature vector comprising a value of that calculated duration and values for the one or more parameters during the calculated duration of that machine event.

4. The method of claim 1, wherein the one or more parameters comprise operating parameters of the engine.

5. The method of claim 1, wherein the one or more parameters represent an event history of the engine.

6. The method of claim 1, wherein the one or more parameters represent a repair history of the engine.

7. The method of claim 1, wherein the machine-learning model comprises a regression.

8. The method of claim 1, wherein the predictive output comprises a confidence value for each predicted future duration.

9. The method of claim 1, wherein the at least one remedial function further includes sending an alert to at least one recipient.

10. The method of claim 1, wherein the one or more machine events comprise a machine event that is required for startup or shutdown of the engine.

11. The method of claim 1, wherein the one or more machine events comprise a process control mode for operation of the engine.

12. The method of claim 1, wherein the one or more machine events comprise an emissions mode of the engine.

13. The method of claim 1, wherein the one or more machine events comprise a state of a valve in the engine.

14. The method of claim 1, wherein the one or more machine events comprise an alert state of the engine.

15. The method of claim 1, wherein determining whether or not the predictive output is indicative of a future abnormal operating state of the engine comprises determining whether or not the predicted future duration of at least one of the one or more machine events satisfies one or more criteria.

16. The method of claim 1, further comprising using the at least one hardware processor to apply a statistical model to at least the calculated durations to detect a trend, wherein the predictive output includes an indication of the trend.

17. The method of claim 1, wherein the engine is a gas turbine engine or gas compressor.

18. A system comprising:

at least one hardware processor; and a memory storing software configured to, when executed by the at least one hardware processor, receive operating data from an electronic control unit of an engine, wherein the operating data includes values for a plurality of parameters of the engine, and wherein the values for the plurality of parameters include values for one or more machine events, calculate a duration of each of the one or more machine events from the values for the one or more machine events, generate a dataset that correlates the calculated durations with values for one or more of the plurality of parameters, receive, from a trained machine-learning model, a predictive output that includes a predicted future duration of each of the one or more machine events, determine whether or not the predictive output is indicative of a future abnormal operating state of the engine, and, when the predictive output is indicative of a future abnormal operating state of the engine, execute at least one remedial function to control the engine, the at least one remedial function including transmitting a control command to the electronic control unit of the engine to initiate a transition of the engine from a first state to a second state that is different than the first state, so as to prevent or mitigate the future abnormal operating state.

19. A non-transitory computer-readable medium having instructions stored thereon, wherein the instructions, when executed by a processor, cause the processor to:

receive operating data from an electronic control unit of an engine, wherein the operating data includes values for a plurality of parameters of the engine, and wherein the values for the plurality of parameters include values for one or more machine events;

calculate a duration of each of the one or more machine events from the values for the one or more machine events;

generate a dataset that correlates the calculated durations with values for one or more of the plurality of parameters;

receive, from a trained machine-learning model, a predictive output that includes a predicted future duration of each of the one or more machine events;

determine whether or not the predictive output is indicative of a future abnormal operating state of the engine; and, when the predictive output is indicative of a future abnormal operating state of the engine, execute at least one remedial function to control the engine, the at least one remedial function including transmitting a control command to the electronic control unit of the engine to initiate a transition of the engine from a first state to a second state that is different than the first state, so as to prevent or mitigate the future abnormal operating state.

20. A non-transitory computer-readable medium of claim 19, wherein the instructions further cause the at least one processor to receive, from a statistical model, a trend, wherein the predictive output includes an indication of the trend.

* * * * *